United States Patent [19]

Ikegaya et al.

[11] Patent Number: 4,787,594
[45] Date of Patent: Nov. 29, 1988

[54] SEAT FOR MOTOR VEHICLES

[75] Inventors: Isao Ikegaya; Makoto Uesugi; Akihisa Yamamoto; Shinya Nakamura, all of Shizuoka, Japan

[73] Assignee: Fujikiko Kabushiki Kaisha, Tokyo, Japan

[21] Appl. No.: 20,698

[22] Filed: Mar. 2, 1987

[30] Foreign Application Priority Data

| Mar. 3, 1986 | [JP] | Japan | 61-44015 |
| May 22, 1986 | [JP] | Japan | 61-116061 |
| May 22, 1986 | [JP] | Japan | 61-116062 |
| May 22, 1986 | [JP] | Japan | 61-116063 |
| Sep. 8, 1986 | [JP] | Japan | 61-209715 |
| Nov. 14, 1986 | [JP] | Japan | 61-269914 |

[51] Int. Cl.$^4$ ............................................. A47D 19/04
[52] U.S. Cl. ................................. 248/421; 248/422; 248/396
[58] Field of Search ............... 297/313; 248/421, 422, 248/396

[56] References Cited

U.S. PATENT DOCUMENTS

| 4,128,225 | 12/1978 | Kluting et al. | 248/421 |
| 4,159,095 | 6/1979 | Pallant et al. | 248/396 |
| 4,326,690 | 4/1982 | Pickles et al. | 248/396 |
| 4,556,185 | 12/1985 | Takagi | 248/421 |

Primary Examiner—James T. McCall
Attorney, Agent, or Firm—Samuels, Gauthier, Stevens & Kehoe

[57] ABSTRACT

A seat for motor vehicle includes a seat cushion whose rear or front section or both are coupled via a link mechanism with a base frame in a manner that can be lifted and lowered, whereby through joining of the link mechanism to a control shaft for height adjustment that can be rotated without any limitation, coupling of one of the rocking ends of a bell crank which repeats a rocking motion, interlocked with the rotation of the control shaft, to the seat cushion, and joining of the other rocking end to the control shaft via a crank, it is possible to adjust the height of the rear section, front section, or both, of the cushion seat between the lowest position and the highest position, for every rocking operation of the bell crank.

11 Claims, 17 Drawing Sheets

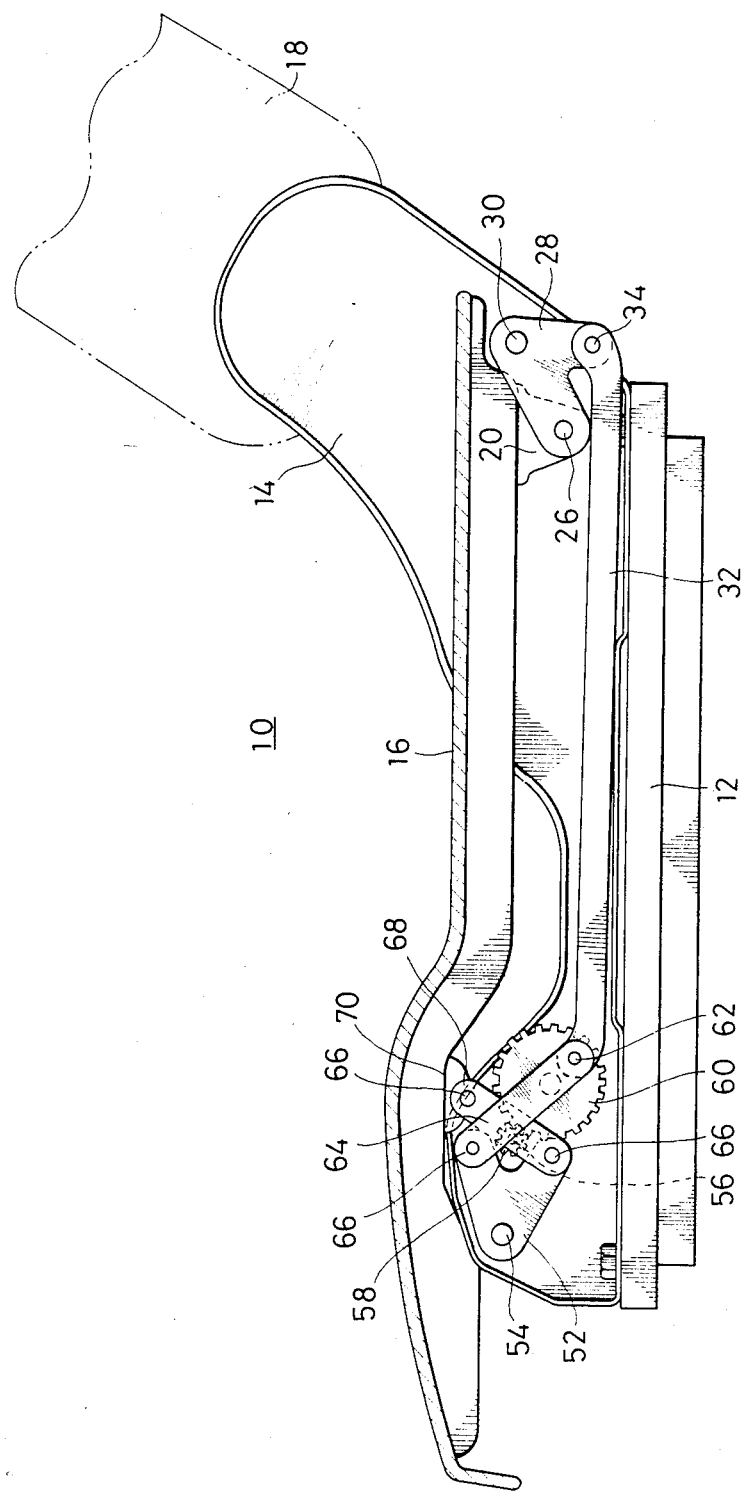

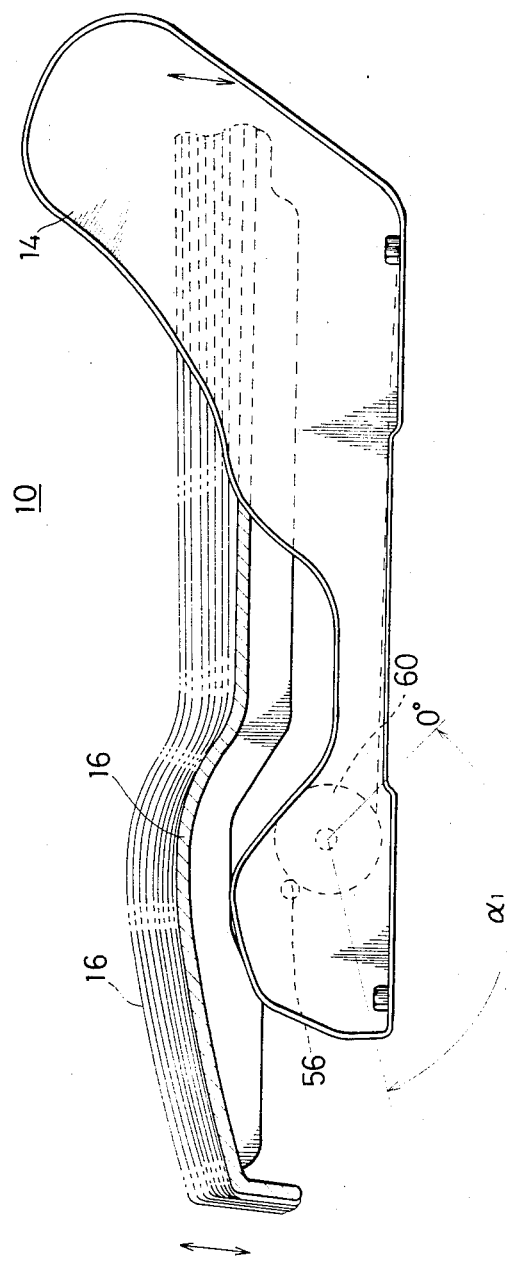

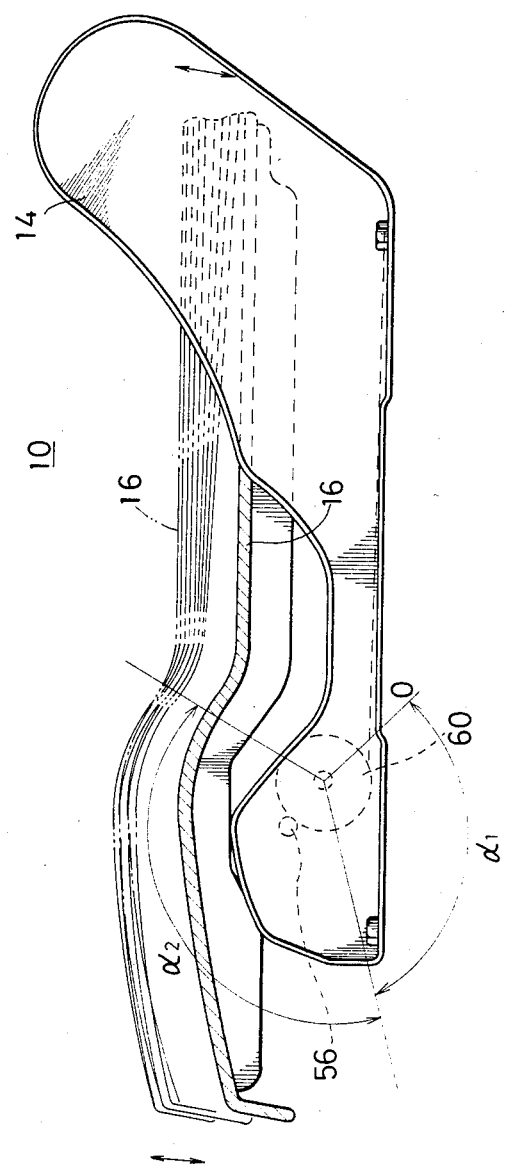

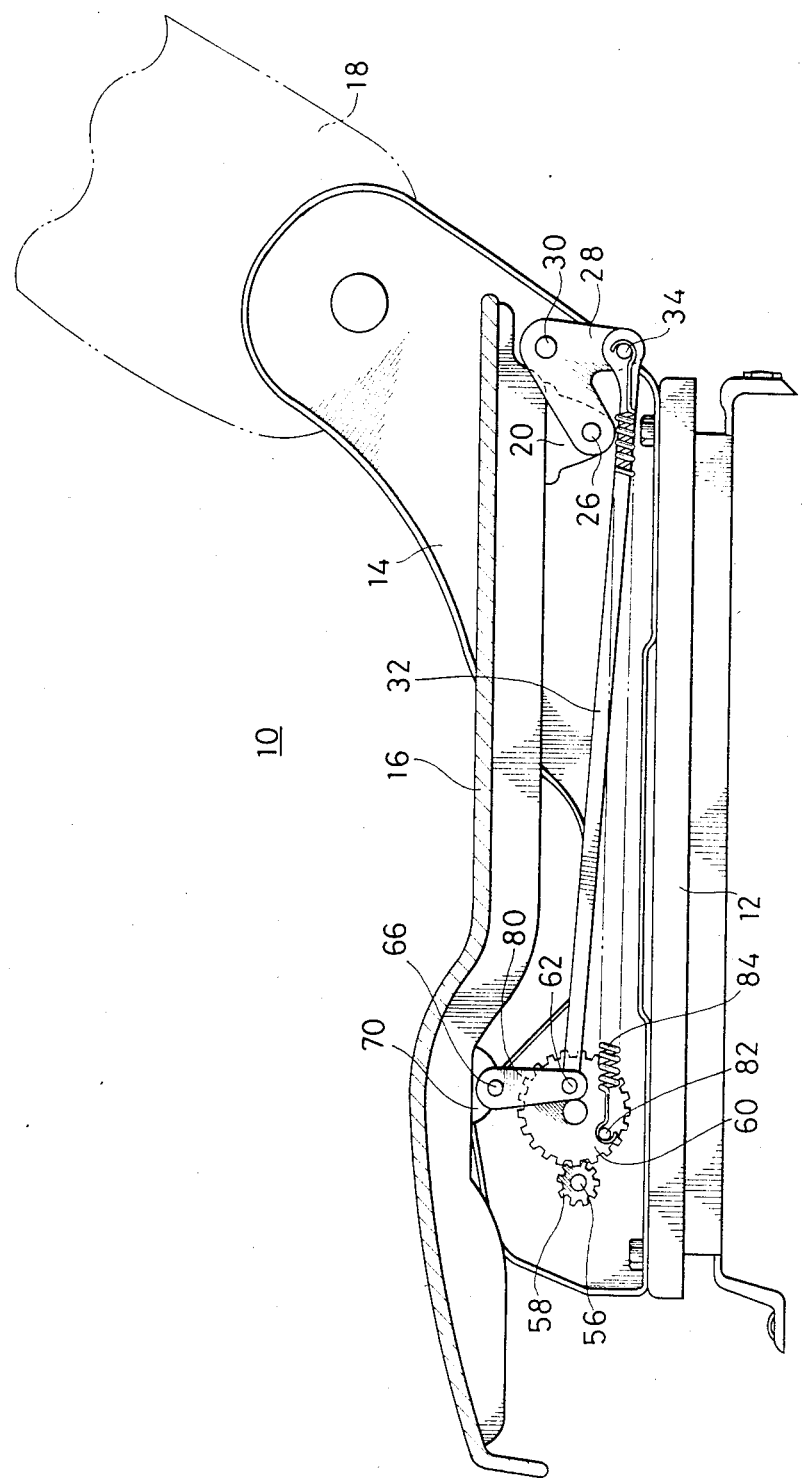

SEAT FOR MOTOR VEHICLES

BACKGROUND OF THE INVENTION

1. Field of the Invention

The present invention relates to a seat for motor vehicles, and more particularly, to a link mechanism which governs the lifting and lowering portion in the height adjustment mechanism for the seat cushion.

2. Description of the Prior Art

In a seat for a motor vehicle, there is incorporated a height adjusting mechanism for the seat cushion. By the use of the mechanism it is possible to adjust the overall height of the seat cushion to match the seated height or the leg length of the user, and raise the rear end or lower the front end of the seat cushion. By so doing, the seat may be made to fit the user, permitting the user to put his feet at a proper position or secure a forward field of vision during driving.

A seat for a motor vehicle equipped with a height adjusting mechanism of the above kind includes an elevating mechanism of the seat cushion and an actuating mechanism for driving the elevating mechanism. As to the elevating mechanism of the above type, various techniques as disclosed in Japanese publications of unexamined utility model applications No. 57-194842, No. 58-49864, No. 60-90030 have been known. In addition, various kinds of techniques similar to the above have also been developed.

An elevating mechanism that is employed commonly in these techniques is mainly a parallel link mechanism. Namely, in these techniques, the upper parts of a pair of links that constitutes the parallel link mechanism are coupled with the front and rear of the seat cushion so as to have the height of the front section, rear section, or both of the seat cushion variably adjustable in response to the changes in the tilting angle of each link.

In a height adjusting means of the above kind, the rocking ends, namely, the upper portion, of the links are coupled directly with the seat cushion, and a control shaft is coupled with the turning center of the cushion so that the turning range of the control shaft is restricted.

In other words, in such a structure, the turning range of the control shaft is limited to the range of from 0° to 90° since the position of the maximum height corresponds to the state in which the links are upright and the position of the lowest height corresponds to the state in which the links are in the horizontal position. Accordingly, it is necessary to turn the control shaft in the reverse direction in order to readjust the seat cushion from either one of these states.

Further, as the operating system for the above kind of height adjustment mechanism, there are a manual type in which the control shaft is turned by the hand of the adjuster who grasps a knob which is provided on one end of the shaft, and a motor driven type, called power lift, in which the control shaft is linked via a reduction mechanism to the output shaft of a power motor which is rotated by the operation of a button, therefore power of the motor being transmitted to the link mechanism.

Accordingly, when the control shaft of the elevating mechanism that adopts the conventional parallel link mechanism is turned manually, there arises a possibility of applying an unreasonable force to the mechanism itself in an attempt to adjustment a range beyond the allowed limit of the operating range. On the other hand, it should be noted that the manual operation system may be advantageous to those who are accustomed to the system. This is because, due to the limitation on the turning of the control shaft, the operator is able to have a feel that suggests the limiting conditions of the rotation that is transmitted directly to his hand.

In contrast, the motor driven system requires a sensor and a device which can give the same kind of feel that the hand receives in the manual operation. These are a limit switch for detecting the stopping position of the motor rotation and a mechanism that carries out a control on the reverse rotation of the motor in response to the detected output of the switch. Consequently, the motor driven system becomes complicated in proportion to the added portion of the mechanism for controlling the rotation.

Therefore, it has to be concluded that neither the manual system nor the motor driven system is a desirable system in the sense that the necessity of regulating the range of rotation may adversely affect the rigidity of the mechanism itself or requires an addition of a mechanism for preventing such an undesirable effect.

SUMMARY OF THE INVENTION

Accordingly, the principal object of the present invention is to provide a seat for motor vehicles having a control shaft for actuating the elevating that can be rotated manually or by the driving of a motor in an unrestricted manner, and that the elevating mechanism can position the height of the seat cushion on an arbitrary level between the lowest position and the highest position, during one rotation of the crank that corresponds to the rotation of the control shaft.

Another object of the present invention is to provide a seat for motor vehicles which can provide miniaturization, a reduction in size, and a reduction in the cost, for the actuating mechanism by an unrestricted rotation of the control shaft.

Still another object of the present invention is to provide a seat for motor vehicles which makes it possible to drive the elevating mechanism in the rear end section of the seat cushion of the seat by an unrestricted rotation of the control shaft.

Still further object of the present invention is to provide a seat for motor vehicles which makes it possible to drive the elevating mechanism in the front end section of the seat cushion of the seat by an unrestricted rotation of the control shaft.

Still another object of the present invention is to provide a seat for motor vehicles which makes it possible to drive the elevating mechanism in the front end section and in the rear end section of the seat cushion of the seat by an unrestricted rotation of a pair of respectively independent control shafts.

Still another object of the present invention is to provide a seat for motor vehicles which makes it possible to drive the elevating mechanism in the front end section and in the rear end section of the seat cushion of the seat by an unrestricted rotation of a single control shaft.

Still another object of the present invention is, to provide a seat for motor vehicles having a system which can drive the elevating mechanism in the front and rear end sections of the seat cushion by an unrestricted rotation of one control shaft, where in the system makes the operations of lifting and lowering of the front end section, quasi-parallel lifting, and lifting and lowering of the rear end section, to be carried out continuously during one rotation of the crank that corresponds to the rotation of the control shaft.

Still another object of the present invention is to provide a seat for motor vehicle which will not suffer from undesirable effects such as twisting to the cushion frame during the lifting or lowering operation.

Still another object of the present invention is to provide a seat for motor vehicles which makes it possible to incorporate a reclining device for adjusting the angle of the seat back and the control portion of the elevating mechanism in one seat without undue effort. These and other objects and advantages of the present invention will become more apparent in connection with the description of several embodiments to be hereinafter described in greater detail. These and other objects and advantages of the present invention will become more apparent in connection with the description of several embodiments to be hereinafter described in greater detail.

BRIEF DESCRIPTION OF THE DRAWINGS

FIG. 1 and FIG. 2 show an embodiment of the present invention, in which FIG. 1 is a side sectional view which illustrates the frame structure of a vehicle seat of this embodiment and FIG. 2 is a sectional view for illustrating the situation during the height adjustment.

FIG. 3 and FIG. 4 show a second embodiment of the present invention in which FIG. 3 is a side sectional view for showing the frame structure of a vehicle seat of this embodiment and FIG. 4 is a sectional view for illustrating the situation during the height adjustment.

FIG. 5 through FIG. 7 show a third embodiment of the present invention, in which FIG. 5 is a sectional view which illustrates the frame structure of a vehicle seat of this embodiment, FIG. 6 is a sectional view for illustrating the up and down motion of the rear section of the cushion frame, and FIG. 7 is a sectional view for illustrating the up and down motion of the front section of the cushion frame.

FIG. 8 and FIG. 9 show a fourth embodiment, in which FIG. 8 is a side sectional view for illustrating the frame structure of the vehicle seat of this embodiment, and FIGS. 9 (a), 9 (b), and 9 (c) are side views for illustrating the three operations of a quasi-parallel lifting, tilting of the front section, and tilting of the rear section of the seat cushion of the seat.

FIG. 10 and FIG. 11 show a fifth embodiment of the present invention in which FIG. 10 is a side sectional view for illustrating the frame structure of the vehicle seat and FIGS. 11 (a) and 11 (b) are diagrams for illustrating the operation of the seat cushion of the seat.

FIG..12 through FIG. 14 show a sixth embodiment of the present invention in which

DETAILED DESCRIPTION OF PREFERRED EMBODIMENTS

Figure 1:
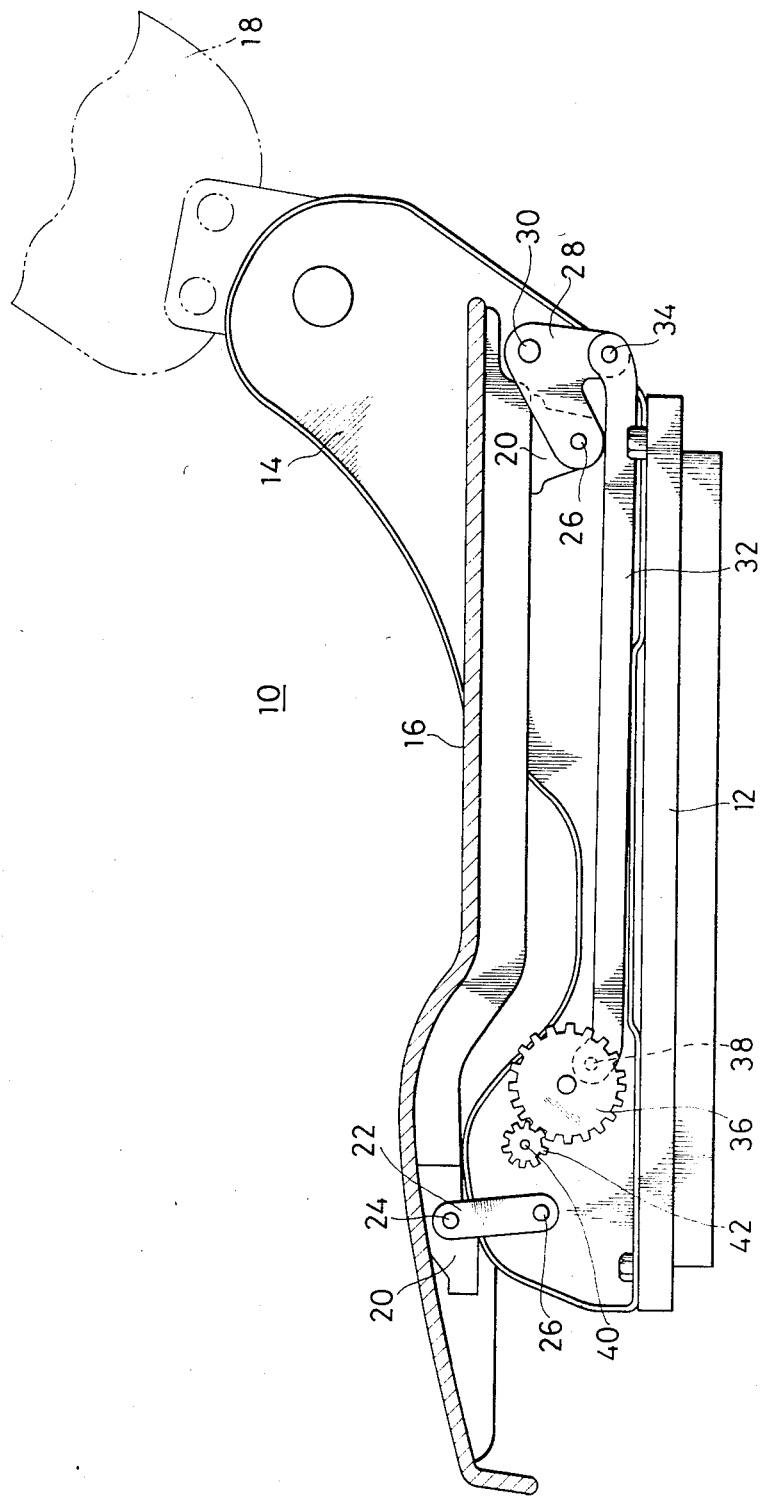

Referring to the drawings for each embodiment, the present invention will be described in detail.

Figure 2:
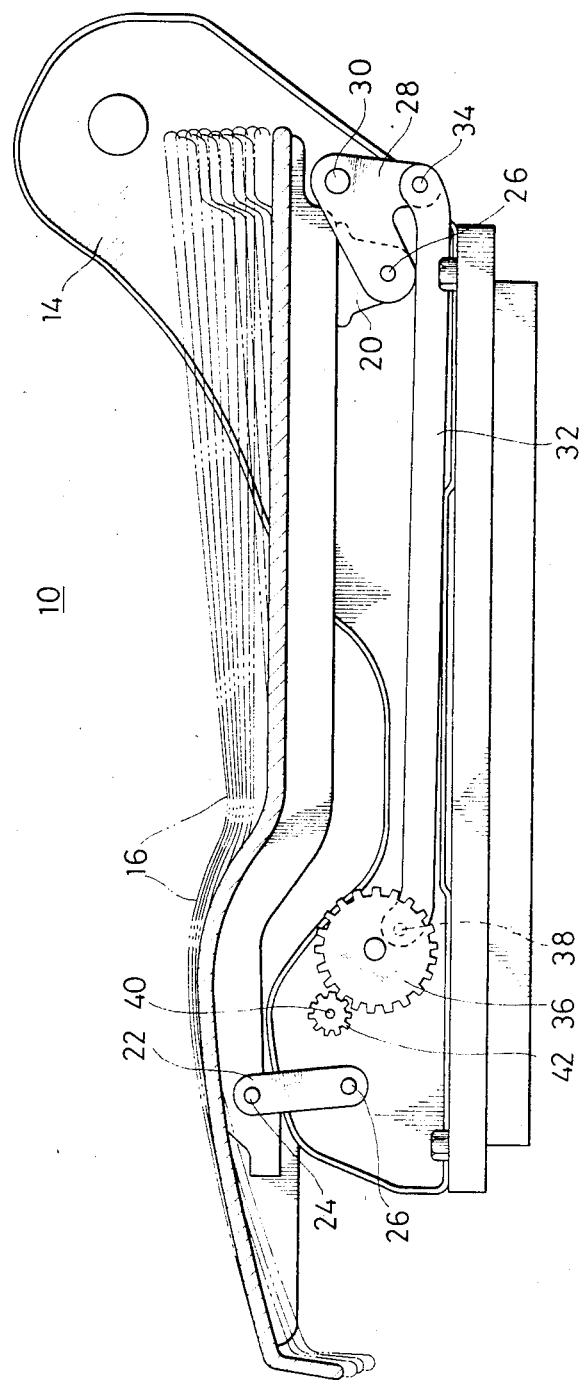

FIG. 1 and FIG. 2 show a first embodiment of the present invention.

In the figures, a vehicle seat 10 consists in the main of a base frame 14 which is fixed on sliding rails 12, a cushion frame 16 which is arranged on the inner upper part of the base frame 14, and a seat back frame which is coupled, as can be tilted forwardly and backwardly, to the rear end section of the base frame 14 via a reclining device that is not shown.

Below the tip of the cushion frame 16, there is fixed a bearing bracket 20, and coupled thereto via a pivotally supporting pin 24 is the upper end of a flat link lever 22.

The lower end of the flat link lever 22 is coupled via a coupling pin 26 to the inner section of the tip of the base frame 14. The flat link lever 22 supports pivotally the tip of the cushion frame 16 turnably, in a state which is approximately perpendicular to the base frame 14 and can rock slightly back and forth.

Further, another bearing bracket 20 is fixed to the lower part of the rear end of the cushion frame 16, and the bracket 20 is linked to the upper rocking end of a bell crank 28 via another coupling pin 26.

The rocking center of the bell crank 28 is pivotally supported by a pivotally supporting pin 30, and the lower rocking end is linked via a linking pin 34 to the rear end of a linking rod 32.

The coupling rod 32 is arranged substantially parallel to the bottom surface of the cushion frame 16, and the tip thereof is coupled to a crank pin 38 which is provided on an end surface of a flat gear 36 that is used commonly as a crank arm.

The flat gear 36 is supported pivotally as turnably to the inside section on the tip of the base frame 14, and it is engaged with a pinion gear 42 provided on a control shaft 40 which is supported by the base frame 14 penetrating through the inner and outer sides of the base frame.

In the above-construction, the flat gear 36 is rotated at a reduced speed via the pinion gear 42 by means of the unidirectional rotational power of the control shaft 40 that is operated from outside.

During one rotation of the flat gear 36, the coupling rod 32 completes one stroke, thereby the bell crank 28 carries out a reciprocating motion in response to the stroke of the coupling rod 32. By this rocking motion, the rear end section of the cushion frame 16 repeats a continuous cycle which, starting from the lowest position shown in FIG. 1, is lifted to the highest position indicated by the imaginary line shown in FIG. 2, with the pivotally supporting pin 24 as the center of turning, and is lowered back again to the lowest position.

Here, a slight back-and-forth motion of the cushion frame 16 during the operation is absorbed by the back-and-forth motion of the flat link lever 22.

The amount of the up-and-down adjustment of the rear end of the cushion frame during its forward tilting is determined by the eccentricity ratio of the crank pin 38 that is provided on the flat gear 36 and the lever length of the bell crank 28.

Accordingly, the control shaft 40 during adjustment can be rotated continuously in an arbitrary direction of rotation along, so that the cushion frame can be fixed at an arbitrary angle of forward tilt by providing an irreversible mechanism for preventing the reverse rotation.

In addition, in the case of driving the control shaft 40 with a motor, angle adjustment becomes possible by the mere provision of a switch along which can drive and stop the motor.

As in the foregoing, according to the first embodiment of the present invention, it is possible to realize a cycle in which the rear end section of the seat cushion is moved continuously between the highest position and the lowest position during one rotation of the flat gear that constitutes the crank arm, by an unrestricted unidirectional rotation of the control shaft. Therefore, there is no need of providing a mechanism for bringing the rotation to a stop as was required in the existing system In particular, in the case of adjusting the forward tilt with the motor power, the entire mechanism can be made simpler with no need for providing a position detection switch and a reverse rotation control.

Figure 3:
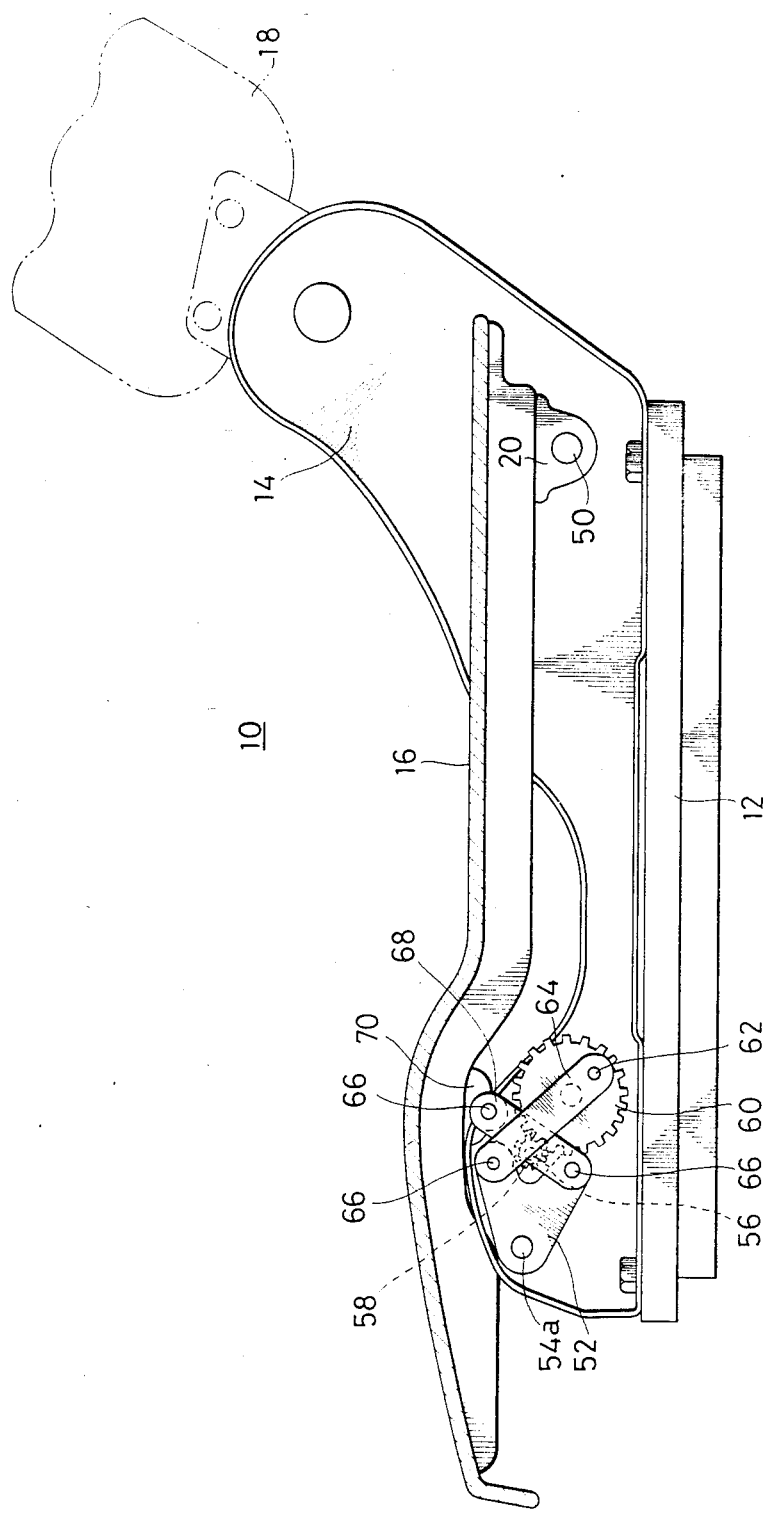
Figure 4:
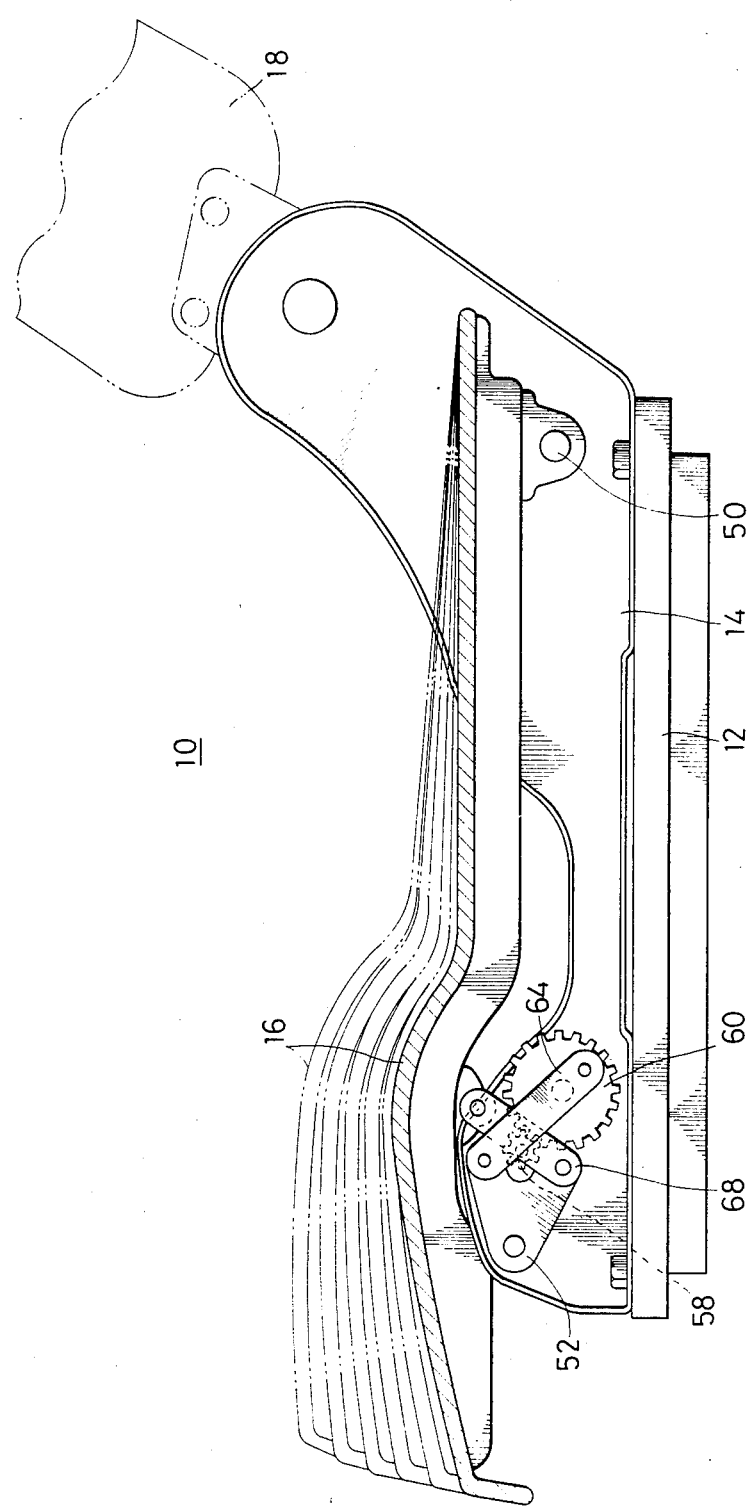

FIG. 3 and FIG. 4 show a second embodiment of the present invention.

In describing the embodiment, members that are common to the first embodiment are given identical symbols and only the parts that are different from those in the first embodiments are assigned different symbols.

In the figures, the vehicle seat 10 is constructed, similar to the first embodiment, mainly of the base frame 14 that is fixed on the sliding rails 12, the cushion frame 16 that is arranged on the top portion of the base frame 14, and the seat back frame 18 that is coupled as tiltable forwardly and backwardly, via a reclining device (not shown), to the rear end section of the base frame 14.

On the bottom of the rear end of the cushion frame 16, there is fixed a bearing bracket 20, and a pivotally supporting pin 50 which is attached on the inner side surface in the rear of the base frame 14 is inserted therethrough. The rear end section of the cushion frame 16 is supported as may be rocked by the base frame 14 with the pivotally supporting pin 50 as the center of turning.

Further, on the inner side surface in the front of the base frame 14, there is supported pivotally the turning center of the bell crank 52 via a shaft 54a, as rockably.

On the inner surface of the base frame 14, in the proximity of the rear section of the bell crank 52, there are arranged a pinion gear 58 which is provided on the control shaft 56 that is supported by penetrating through the inner and outer peripheries of the frame 14, and a flat gear 60 that engages the pinion gear 58. The flat gear 60 serves also as a crank arm, and on its end surface there is provided a crank pin 62 with a predetermined eccentricity, projecting from the center of turning.

One end of a first flat link lever 64 is coupled with the crank pin 62 while the other end is joined via a coupling pin 66 to the upper rocking end of the bell crank 52.

Further, the lower rocking end of the bell crank 52 is coupled with the lower end of a second flat link lever 68 via a coupling pin 66.

The upper end of the flat link lever 68 is coupled similarly via a coupling pin 66 to a bracket 70 which is fixed to the lower front end of the cushion frame 16, with the link levers 64 and 68 crossing each other in the form of the letter X.

It should be noted that, although the bell crank 52, pinion gear 58, flat gear 60, and flat link levers 64 and 68 are depicted as if they lie in a same plane, they are arranged adjacently so as not to obstruct their mutual rotations or rocking motion.

With the construction as in the above, the flat gear 60 is rotated at a reduced speed via the pinion gear 58 by a rotational power of the control shaft 56 given by an operation from the outside. By this motion, the bell crank 52 is rocked and repeats a cycle in which, during one rotation of the flat gear 60, the front end section of the cushion frame 16 is lifted from the lowest position shown in FIG. 3 to the highest position that is shown by the chained line in FIG. 4 with the pivotally supporting pin 50 as the turning center, and is lowered again to the lowest position.

The amount of the adjustment is determined by the eccentricity ratio of the crank pin 60, the length of the levers, and so forth.

Therefore, the control shaft 56 can be rotated toward an arbitrary unidirection continuously, so that by providing a mechanism for preventing the reverse rotation on the control shaft 56, it is possible to fix the cushion 16 at an arbitrary height.

Further, in the case of driving the control shaft 56 with a motor, height adjustment can be realized by the mere use of a switch for driving and stopping the motor, without requiring a checking mechanism for reverse rotation.

According to the second embodiment, it is possible to realize, in one rotation of the crank arm, a cycle which moves continuously between the highest and the lowest positions of the front end section of the cushion during one rotation of the flat gear, by an unrestricted unidirectional rotation of the control shaft. Therefore, similar to the first embodiment, there is no need for providing a mechanism for stopping the rotation, and in particular, in the case of height adjustment with motor power, the mechanism can be simplified without requiring a position detection switch or a control for preventing reverse rotation.

Figure 5:
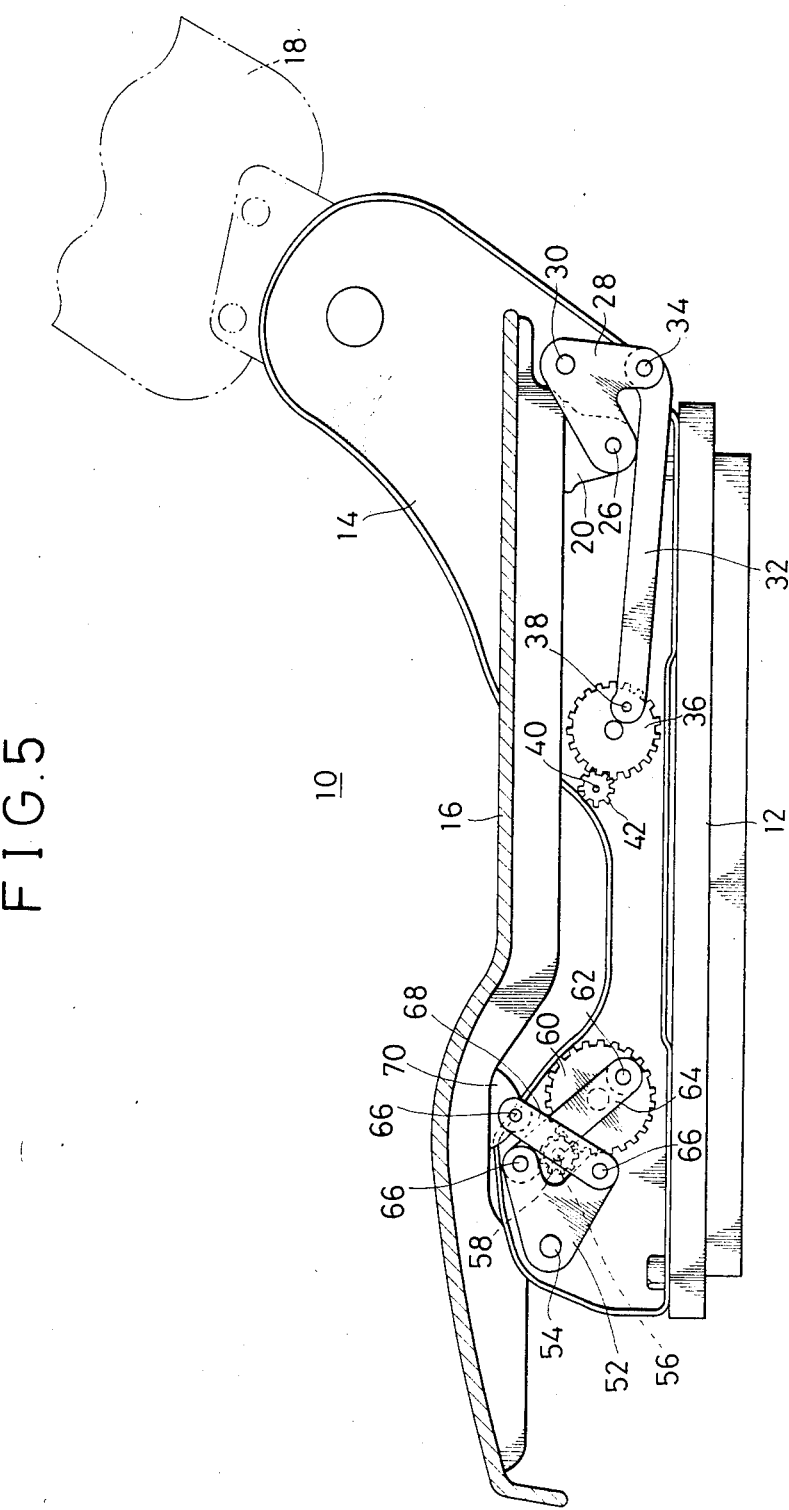
Figure 6:
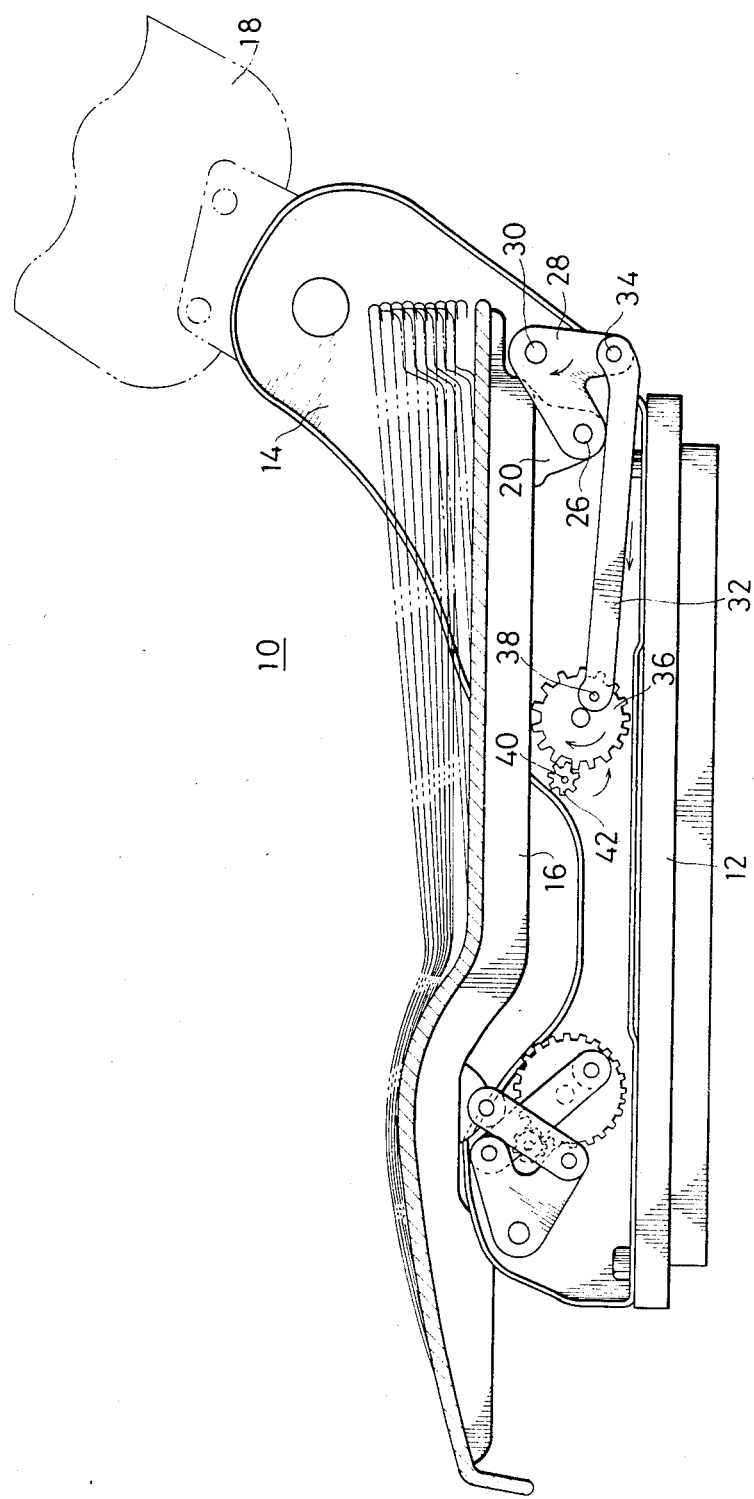
Figure 7:
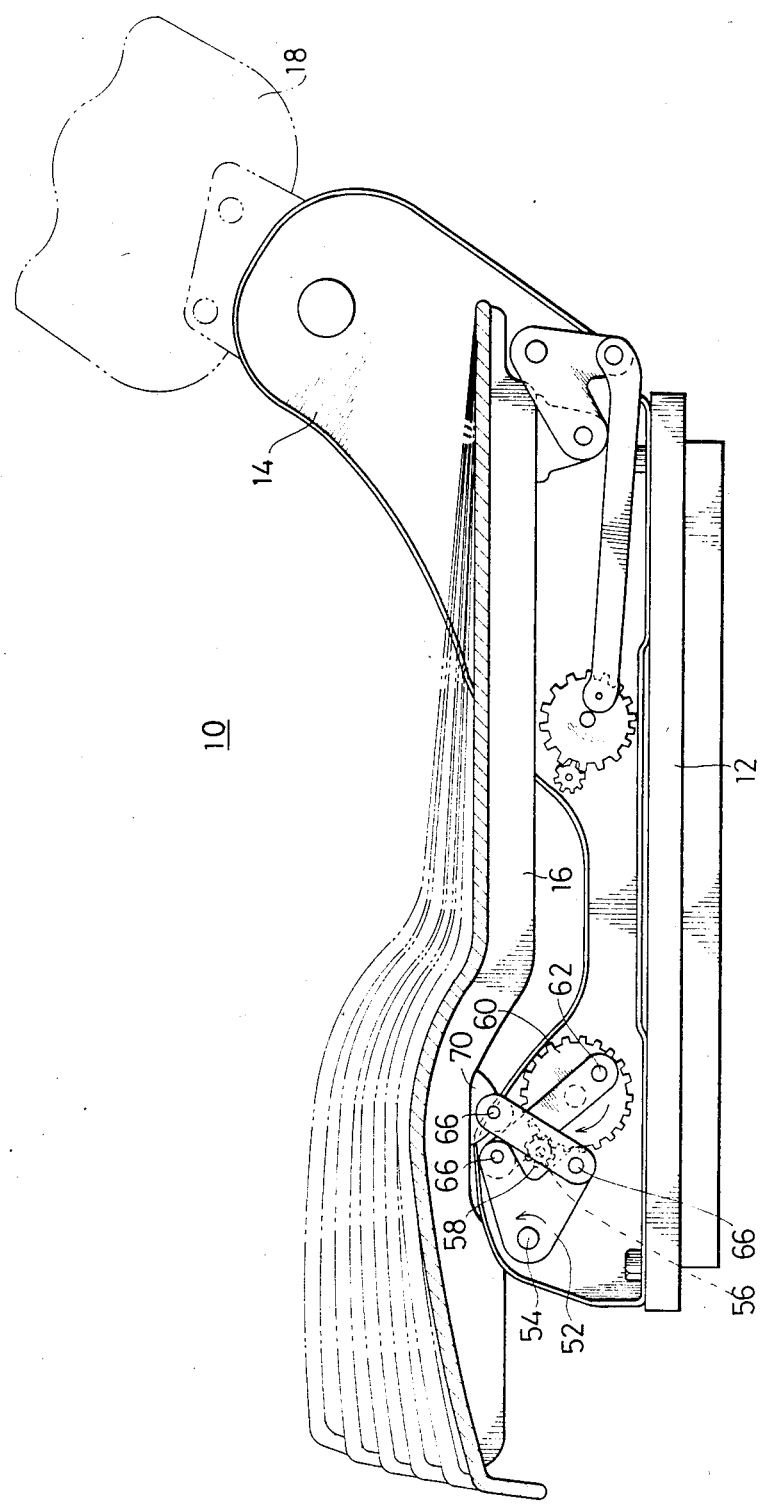

FIG. 5 to FIG. 7 show a third embodiment of the present invention.

The embodiment has a construction in which, by a combination of the first and the second embodiments, the height of the front end and the rear end of the seat cushion can be adjusted by a pair of control shafts. Consequently, the present embodiment consists mostly of members that are common to the first and the second embodiments. The principal difference from the first embodiment is the positions of the coupling rod 32 and the control shaft 40 which is interlocked to the rod 32. For that reason, only the important part of the present invention will be described, and explanation of the other part is omitted by showing the most part in thereof figures with symbols that are common to these embodiments.

Namely, in the present embodiment, the mechanism which includes the control shaft 56 on the front side has a construction similar to the second embodiment, and the position of the control shaft 40 on the rear side is receded to the center of the base frame. The main point of modification in the present embodiment is the reduction in length of the coupling rod 32.

Accordingly, in the present embodiment, the rear side is displaced as shown in FIG. 6 from the lowest position to the highest position by the rotational operation of the control shaft 40, and the front side is displaced in response to the rotation of the control shaft 56 as shown in FIG. 7.

In the third embodiment, it is possible to move cushion frame up and down parallel to the floor and fix the front on the rear at a predetermined height, by rotating independently the front and the rear control shafts in the same direction. Therefore, the adjustment range can be expanded and the selection range of the angular position can also be widened.

Figure 9C:
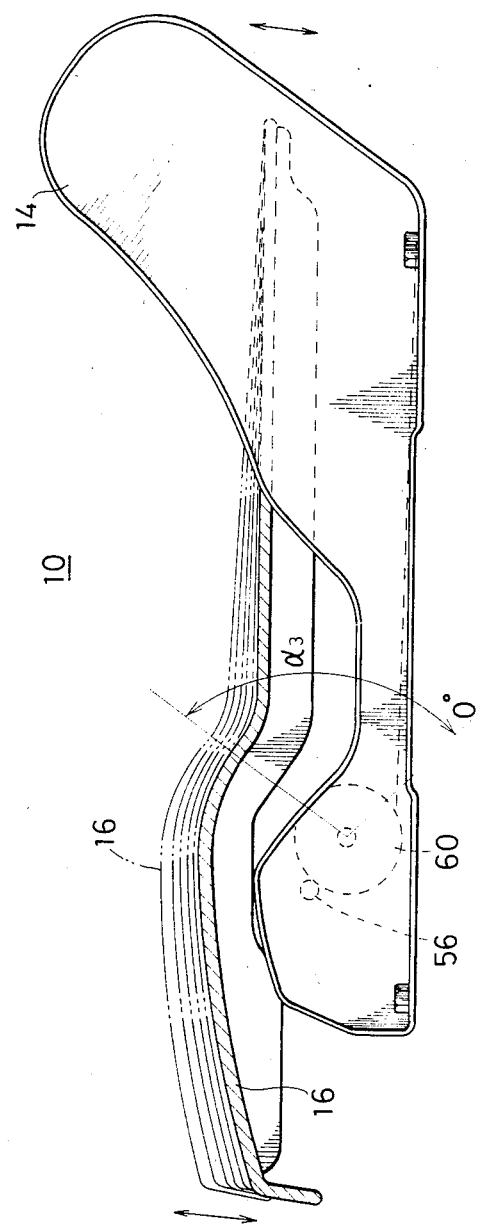

FIG. 8 and FIG. 9 show a fourth embodiment of the present invention.

The construction of the embodiment shown in the figure looks at a glance like a modification of the third embodiment. In other words, in the present embodiment, the difference is that the pinion gear 42 and flat gear 36 that are interlocked with the bell crank 28 on the rear side are removed, and the coupling rod 32 is prolonged toward the front as in the first embodiment and is axially linked to the crank pin 62 of the flat gear 60 on the front side as shown in the second embodiment.

However, the action of the present embodiment is very much different from those of the first to the third embodiments, and represents a very peculiar form. Accordingly, the present embodiment will be described with special emphasis on the action during the lifting or lowering of the cushion frame.

The rear side of the cushion frame 16 is raised and lowered to the height that corresponds to the eccentricity ratio of the crank pin 62 and the lever ratio of the bell crank 28 on the rear side, by the rotation of the flat gear 60 that corresponds to the rotational operation of the control shaft 56.

In addition, the front side of the cushion frame 16 moves up and down synchronized with the bell crank 28 on the rear side, within the range of a certain predetermined turning angle $\alpha_1°$ of the crank pin 62, with the lowest height as the starting position as shown in FIG. 9 (a), by the pushing up of the bell crank 52 by the flat link 64.

Consequently, within the range of 0° to $\alpha_1°$, the front and the rear of the cushion frame 16 are raised and lowered substantially parallel to the floor as shown by the imaginary lines by a quasi-parallel link motion, so that it is possible to carry out a parallel adjustment with 0° as the lowest and $\alpha_1°$ as the highest height positions.

In the state that exceeds the angle $\alpha_1°$, the bell crank 28 on the rear side is still in the process of ascent whereas the raised amount of the front side bell crank 52 is small as shown in FIG. 9 (b), and as a result, the cushion frame 16 is tilted forwardly as in the imaginary lines.

In other words, the difference in the lever ratios between the front and the rear cranks is made conspicuous. The above state continues to exist within the range $\alpha_2°$ of angle until the bell crank 28 on the rear side is rocked to the descending side.

Next, in the range of angle $\alpha_3°$ which covers the region from the state of exceeding the angle $\alpha_2°$ to the original reference position, the rear side bell crank 28 is about to pass the maximum rocked condition, as shown in FIG. 9 (c), with little change in the height. In contrast, the front side bell crank 52 is pushed up further toward the ascending side so that the cushion frame 16 is tilted backward with its front end pushed up till a maximum height.

Following that, the front end of the cushion frame 16 descends later than the rear end and returns to its lowest height position shown by the solid line in each figure, while regaining slowly the posture which is parallel to the sliding rails.

Accordingly, the present embodiment enables the cushion frame 16 to carry out continuously three operations of quasi-parallel lifting, front section tilting, and rear section tilting, during one rotation of the control shaft 56.

The amount of height adjustment and the forward and backward tilting angles in the above operations can be set appropriately in response to the lever ratios of the bell cranks 28 and 52, the eccentricity of the crank pin 62, and the lengths of the flat links 64 and 68.

Further, an ordinary seat back carries out adjustment mainly of the amount of the parallel lifting and the amount of the backward tilting, so that the adjustment of the parallel lifting and the backward tilting may be carried out by a clockwise and a counterclockwise rotations, respectively, of the control shaft 56, by locking the range of angle $\alpha_2$ that is needed for the intermediate forward tilting.

Moreover, in the case of carrying out mainly the quasi-parallel lifting of the cushion frame 16, for example, it can be achieved by giving a construction in which the point of the pivotal support (pivotally supporting pin 54) of the front side bell crank 52 by the base frame 14, and the point of pivotal support (coupling pin 66) of the flat link 68 by the front side bracket 70, are shifted toward the lower side, namely, toward the sliding rails 12.

Furthermore, in the case of carrying out mainly the two operations of tilting of the front section and tilting of the rear section, for example, they can be achieved by giving a construction in which the point of the pivotal support (coupling pin 66) of the flat link 64 by the front side bracket 70 is shifted to the crank pin 62 side.

According to the fourth embodiment, the three operations of the quasi-parallel lifting, tilting of the front section, and tilting of the rear section, mainly the two operations of quasi-parallel lifting and tilting of the front section, mainly the two operations of tilting of the front section and tilting of the rear section, or mainly the operation of quasi-parallel lifting, can be carried out selectively by the use of a single mechanism. As a result, the entire mechanism can be simplified, and moreover, the adjustment operations can be accomplished by the use of a single control knob or lever or by means of motor driving, so that the adjustment work can also be simplified.

Figure 11A:
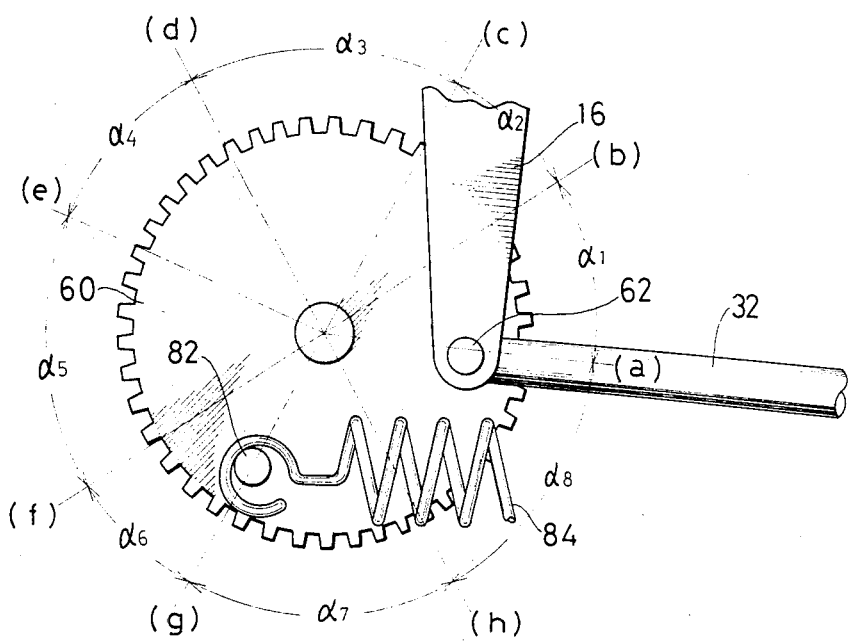
Figure 11B:
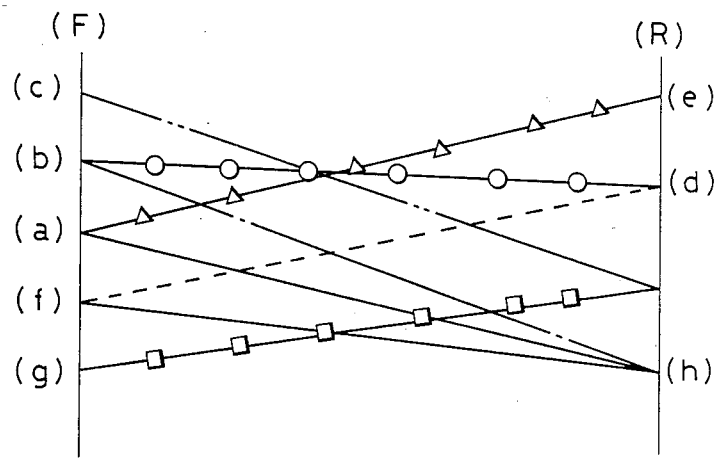

FIG. 10 and FIG. 11 show a fifth embodiment of the present invention.

The embodiment may even be said to be a modification of the fourth embodiment. The reason for this is that the lifting and lowering operation of the front and the rear ends and the quasi-parallel lifting of the seat cushion can be carried out by means of a single control shaft.

However, a feature of the embodiment is that although the mechanism for lifting and lowering the seat cushion is being simplified markedly, the above-mentioned three operations can be accomplished.

The important part of the present embodiment is as follows.

In the FIGS. 10 and 11, the lower end of a flat link 80 is joined axially to the crank pin 62 of the flat gear 60. The upper end of the flat link 80 is coupled via a coupling pin 66 with the bracket 70 that is provided below the cushion frame 16.

Further, between the flat gear 60 and the rear side bell crank 28, there is hung a pulling coil spring 84, with its one end engaged with an attaching pin 82 that is provided projectingly from the flat gear 60, and its the other end engaged with the coupling pin 34. By means of the biasing force of the pulling coil spring 84, the cushion frame 16 is biased all the time toward the lifting side, by the pulling of the bell crank 28 and the flat gear 60 in the directions to bring them closer.

Next, the lifting and lowering operation of the above structure will be described.

By the rotation of the flat gear 60 that corresponds to the rotational operation of the control shaft 56, the rear side of the cushion frame 16 is lifted or lowered to the height position that corresponds to the eccentricity ratio of the crank pin 62 and the lever ratio of the bell crank 28.

Further, the front side of the cushion frame 16 is lifted or lowered to the height position that corresponds similarly to the eccentricity ratio of the crank pin 62 and the lever ratio of the flat link 80.

Then, the front side of the cushion frame carries out an ascending and descending motion with a predetermined delay with respect to the ascending and descending motion of the rear side that accompanies the rocking motion of the bell crank 28 that is caused by the difference between the two lever ratios and eccentricity ratios. These conditions are illustrated in FIGS. 11 (a) and 11 (b).

Both figures show the see-saw motion of the front and rear sides of the cushion frame, from the position marked (a) to each of the positions (b) through (h) that correspond to the rotational angles $a_1°$ through $a_8°$ that cover 360°. Corresponding to these angular positions, the cushion frame 16 covers the ranges of the rising of the front end in the forward tilted state, the parallel lifting, and the lowering of the rear end in the backward tilted state. Accordingly, by adjusting the rotational angle of the flat gear 60, it is possible to realize the three kinds of states of parallel lifting motion and the forward and backward tilted motions.

Further, in the foregoing embodiments, the bell crank 28 was arranged on the rear side while the flat gear 60 and the flat link 80 that is coupled with the gear 60 were arranged on the front side. Needless to say, however, the arrangement of these components may be reversed. Moreover, as the driving power for the control shaft 56, an exclusive driving motor may be employed instead of a control knob or lever that is joined to the control shaft with an axis.

According to the fifth embodiment, the mechanism be simplified than in the fourth embodiment.

Figure 12:
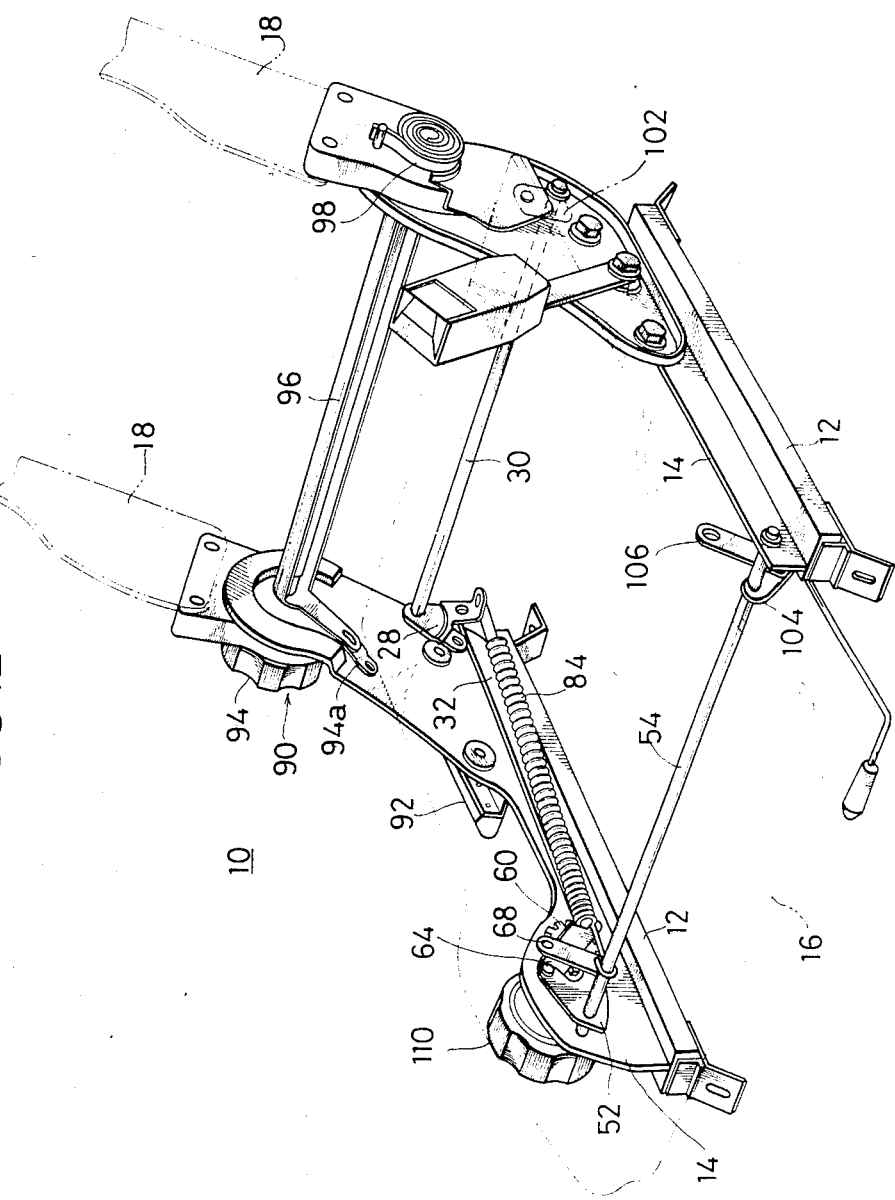
FIG. 12 is a perspective view of the frame structure of a vehicle seat of this embodiment.
Figure 13:
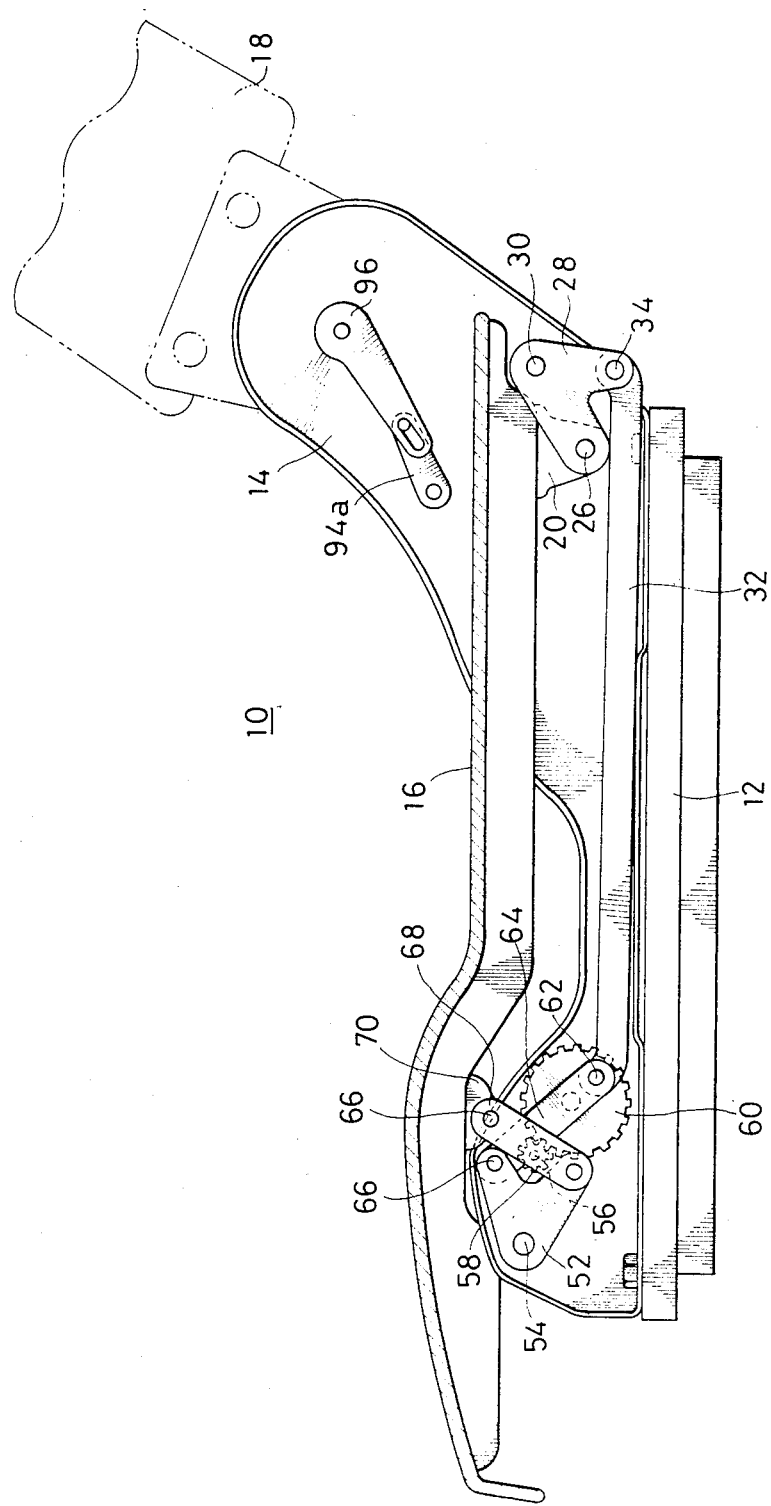
FIG. 13 is a side sectional view.
Figure 14:
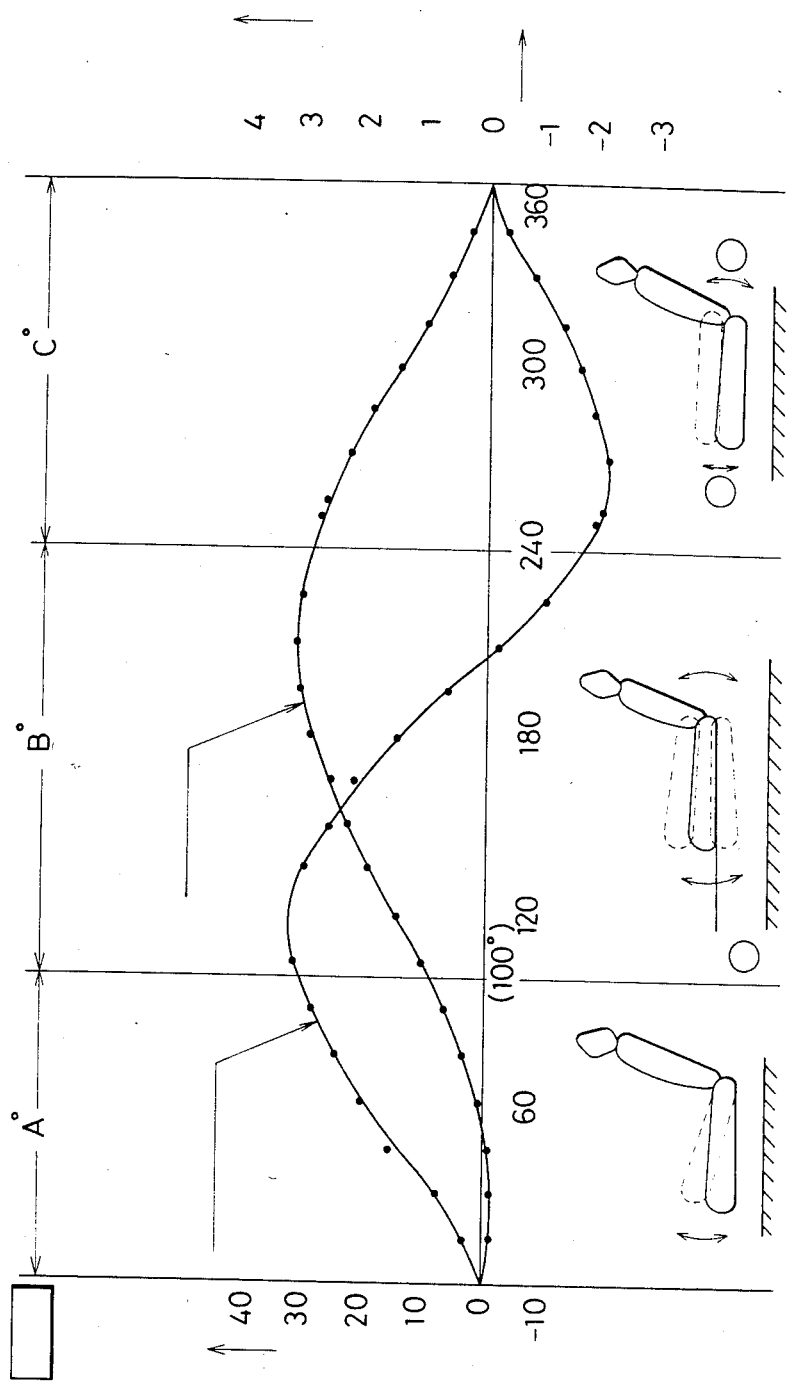
FIG. 14 is a diagram for illustrating the operational mode.

FIG. 12 through FIG. 14 show a sixth embodiment which applies the present invention in a way that is suited for practical uses.

In other words, in the first through fifth embodiments, description was presented by focusing the attention only the mechanism that is related to the principle of the present invention. In contrast, in the present embodiment, description will be given by mentioning the forms and combinations of the members that constitute the height adjustment mechanism which is close to the reality that is suited for the mounting on the seat, and even referring to the configurational relationship to the reclining device that is provided along with the seat height adjustment mechanism. Further, in the present embodiment, illustrations will be given having in mind the driver's seat which is mounted on the right-hand side of the vehicle. However, it will be easy to imagine that, for a driver's seat on the left-hand side of the vehicle, the relevant figures will be those that are symmetric to the figures that will be shown in the following.

In the figures, a vehicle seat 10 is constructed roughly with a pair of base frames 14 fixed on a pair of sliding rails 12 that are arranged on the vehicle floor, back frames 18 which are supported turnably by the rear end section of the base frames 14, and a cushion frame 16 which is supported on the inner upper side of the base frame 14 in a manner which is possible to be raised or lowered and tilted forwardly or backwardly.

The cushion frame 16 is a press-molded body made of steel plate or the like formed in the shape of a rectangular frame. A seat cushion is completed by placing springs or the like that are not shown over the frame, and assembling pads and surface decorating material. In addition, each of the back frames 18 has a similar rectangular frame form, and a seat back is completed by assembling members mentioned above.

Accordingly, what is of concern is a distortion phenomenon due to imbalance of loads that may be applied on the left and right sides of the frames 16 and 18 during ascent or descent of the cushion frame 16 or during forward or backward tilting of the back frames 18. In the embodiments that follow, a structure is employed which will equalize the loaded states on the left and the right sides, when a force is applied to the height adjustment mechanism or the reclining device that is provided on one of the side surfaces of the frame 16 or 18.

On one side in the rear section of the base frames 14, there is arranged a latch type or a swash plate type reclining device 90, with its latch lever 92 extending toward the front side. In addition, a reclining knob 94 is projected from the side in the rear end of the base frame 14.

The lower ends of the back frames 18 are connected to connecting shaft 96 that is supported axially between the base frames 14. One end of the connecting shaft 96 is turned interlocked with a revolving lever 94a of the reclining device 90 and transmits the power to the other back frame 18, to equalize the loads on both sides of the back frames 18. Joining the other side of the back frame 18 and the connecting shaft 96, there is interposed a wound spring 98 which energizes the back frame 18 to its forward falling side all the time.

Because of this, by setting the reclining device 90 to the free state through the operation on the latch lever 92, the back frames 18 tend to fall forward with the connecting shaft 96 as the center of turning.

By applying a load to the back frames 18 in order to cope with the above trend, the back frames 18 are tilted backwardly, and by releasing the lever 92 at an arbitrary angle, the reclining device 90 is latched and the back frames 18 are held at that angular posture. Here, the load is applied via the connecting shaft 96 to the back frames 18 uniformly to the left and the right sides so that the distortion phenomenon can be prevented.

The cushion frame 16 is held on the base frames 14 according to the following mechanism.

Namely, in the front and the rear on the inner section of one of the base frames 14, a pair of bell cranks 52 and 28 are mounted pivotally as rockable via pivotally supporting shafts 54 and 30. One of the racking ends of the rear side bell crank 28, of the two bell cranks 52 and 28, is coupled via the coupling pin 26 with the bracket 20 that is provided on the rear bottom surface of the cushion frame 16.

Further, the lower rocking end of the front side bell crank 52 and the bracket 70 that is provided on the front bottom of the cushion frame 16 are coupled by a flat link 68 which has its both ends joined with coupling pins 66.

In addition, the other ends of the pivotally supporting shafts 54 and 30 are supported axially by the base frame 14 on the other side as shown in FIG. 12, and are coupled with the crank levers 102 and 104 that are provided on the frame 14 directly and via a flat link 106, respectively.

On one of the base frame 14, there is supported axially a control shaft 56, and a pinion 58 which is formed as a united body on the periphery of the control shaft 56 is engaged with the flat gear 60.

On an end surface of the flat gear 60, there is provided a crankpin 62 projecting from the surface with a predetermined eccentricity ratio. The crankpin 62 and the coupling pin 66 provided in the upper rocking end of the front side bell crank 52 are coupled with a flat link 64.

Moreover, the crank pin 62 and a coupling pin 34 which is provided in the lower rocking and of the rear side bell crank 28 are coupled with a coupling rod 32. In a manner described in the above, the rear side bell crank 28 and the front side bell crank 52 are interlocked with the rotation of the flat gear 60.

Furthermore, between both bell cranks 28 and 52, there is hung a pulling coil spring 84. The spring absorbs the looseness in the relative positions between the cranks as well as biases the cushion frame 16 to the side of upper position all the time, facilitating the lifting operation.

In addition, a control knob 110 is joined axially to the end of the control shaft 56 that projects outwardly from the base frame 14.

Next, the lifting function and the forward and backward tilting function of a vehicle seat 10 with the above construction will be described.

First, the state shown in FIG. 13 corresponds to that in which the cushion frame 16 is at its lowest position and the flat gear 60 is at its original position. In this state, by rotating the control knob 110 in the clockwise direction in the figure, the front side of the cushion frame 16 is raised corresponding to the range of turning with an angle of A° in FIG. 14.

Next, in the turning range of B°, the front side of the cushion frame 16 tends to descend somewhat from its highest position and the frame is raised as a whole, achieving a quasi-parallel lifted state.

Next, in the turning range of C°, the front side descends from the lifted position, followed by a descent of the entire frame, and the cushion frame 16 returns again to the lowest position which is the original position.

In other words, the operational modes during one rotation of the flat gear 60 are, a forwardly tilted state of the cushion frame 16 in the range from the origin to A°, a parallel lifted state of the cushion frame in the range of angle B°, and the return to the original position while tilted backward of the cushion frame in the range of angle C°.

Accordingly, it is possible to position the cushion frame 16 to a posture that corresponds to the purpose, depending upon the height or preferred posture of the user, securing the field of vision, and so on, by the turning of the control knob 110. Further, the power for the above purpose can be applied uniformly to the cushion frame 16 for the left and right sides through the pivotally supporting shafts 30 and 54, preventing the left-right distortion of the cushion frame 16.

Needless to say, the amount of displacement of the cushion frame and the turning points of the various postures can be set to the values corresponding to the various lever ratios and the eccentricity ratios.

Figure 15:
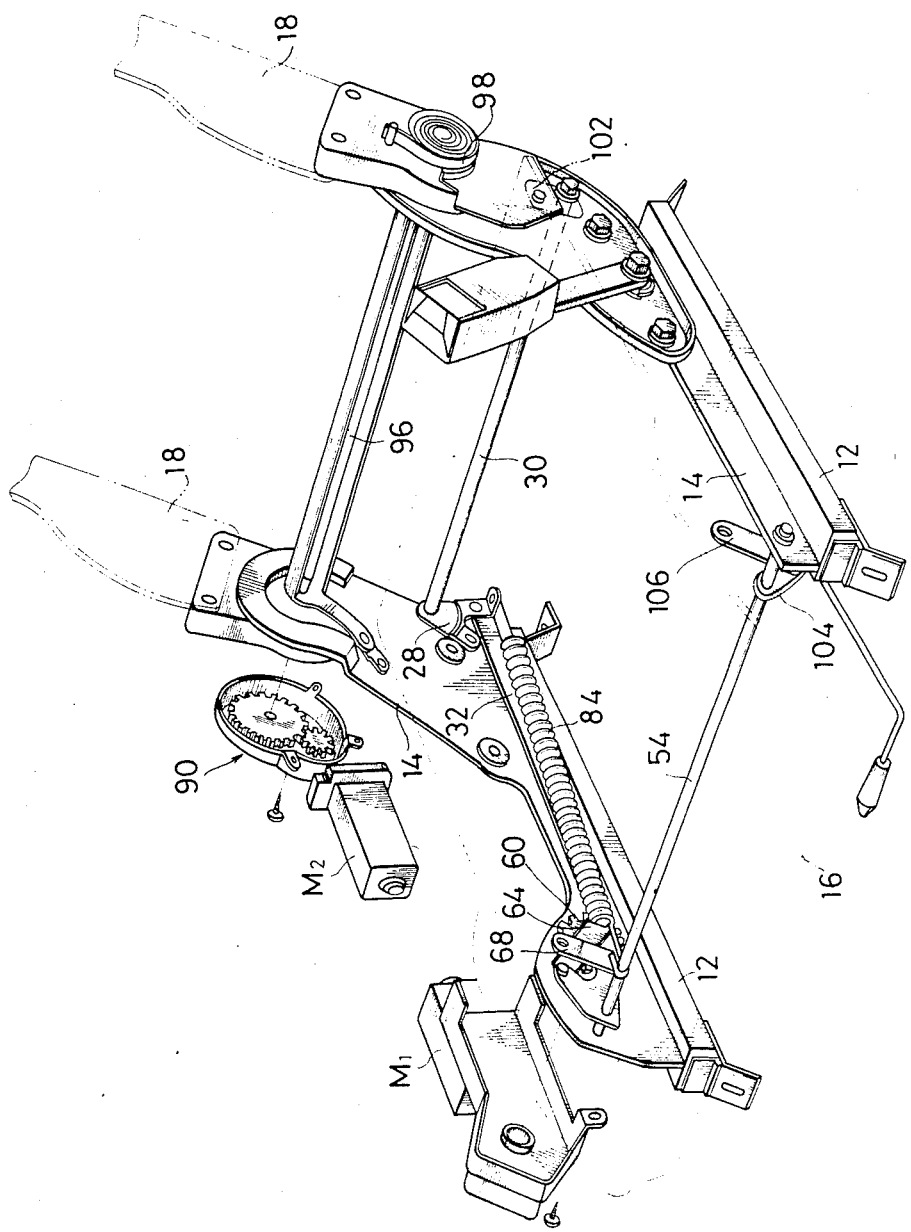
FIG. 15 is a perspective view for illustrating a modification of the frame structure of the sixth embodiment.

Next, FIG. 15 shows a modification of the sixth embodiment.

In the figure, the construction of the mechanism for lifting the cushion frame 16 and for the forward and backward tilting of the back frames 18, is the same as in the first embodiment. Note, however, that the control shaft is joined to the output terminal of a lifter motor unit $M_1$ which incorporates an electrical motor and a reduction mechanism into a united body so that operations mentioned above can be realized by means of the driving of the motor.

Further, the reclining device 90 makes use of a swash plate type mechanism alone, and the driving axis of the reclining device 90 is driven by a motor unit $M_2$.

In other words, in the present embodiment, reclining of the seat back, and the lifting and forward and backward tiltings of the seat cushion, are arranged to be accomplished by the switch driving in place of the manual operation.

In the sixth embodiment and its modification, the three functions of seat back reclining, lifting and forward and backward tiltings of the seat cushion can be incorporated into the seat, without accompanying complication of the mechanism or without accompanying problems involving rigidity of the component parts.

The present invention has been described in detail in conjunction with the various embodiments. However, the spirit and advantages of the present invention will not be limited to these embodiments, and needless to say various modifications and applications will become possible without deviating from the scope of the claims that will be presented in what follows.

What is claimed is:

1. A seat for motor vehicles having an elevation mechanism for the rear side of the seat, which comprises:

a base frame adapted to be arranged on a floor surface of a vehicle body, said base frame having a front section and a rear section;

a cushion frame having front and rear portions, the front portion of said cushion frame being supported rockably on the front section of said base frame;

a control shaft rotated by drive means;

a bell crank having two rocking ends, said bell crank being rockably supported on the rear section of said base frame, with one of said rocking ends being coupled with the rear portion of said cushion frame;

crank means for imparting the rotation of said control shaft to said bell crank in a manner such that during one rotation of said crank means, said bell crank performs one rocking motion, said crank means having a crank pin; and coupling means having two ends, one of said ends being coupled with the crank pin of said crank means and the other of said ends being coupled with the other rocking end of said bell crank.

2. A seat for motor vehicles as set forth in claim 1, wherein a pinion gear is provided on said control shaft, and said crank means comprises a spur gear on which said crank pin is eccentrically provided, said spur gear being engaged with said pinion gear so as to be rotated in accordance with the rotation of said pinion gear.

3. A seat for motor vehicles having an elevation mechanism for the front side of the seat, which comprises:

a base frame adapted to be arranged on a floor surface of a vehicle body, said base frame having a front section and a rear section;

a cushion frame having front and rear portions, the rear portion of said cushion frame being supported rockably on the rear section of said base frame;

a control shaft rotated by drive means;

a bell crank having two rocking ends, said bell crank being rockably supported on the front section of said base frame, with one of said rocking ends being coupled with the front section of said cushion frame;

crank means for imparting the rotation of said control shaft to said bell crank in a manner such that during one rotation of said crank means, said bell crank performs one rocking motion, said crank means having a crank pin; and coupling means having two ends, and one of said ends being coupled with the crank pin of said crank means and the other of said ends being coupled with the other rocking end of said bell crank.

4. A seat for motor vehicles as set forth in claim 3, wherein a pinion gear is provided on said control shaft, and said crank means comprises a spur gear on which said crank pin is eccentrically provided, said spur gear being engaged with said pinion gear so as to be rotated in accordance with the rotation of said pinion gear.

5. A seat for motor vehicles having elevation mechanisms for rear and front sides of the seat, which comprises:

a base frame adapted to be arranged on a floor surface of a vehicle body, said base frame having a front section and a rear section;

a cushion frame having front and rear portions, the front and rear portions of said cushion frame being supported rockably on the front and rear sections of said base frame, respectively;

a first control shaft rotated by first drive means;

a first bell crank having two rocking ends, said first bell crank being rockably supported by the rear section of said base frame, one of said rocking ends being coupled with the rear portion of said cushion frame;

first crank means for imparting the rotation of said first control shaft to said first bell crank in a manner such that during one rotation of said first crank means said first bell crank performs one rocking motion, said first crank means having a crank pin;

first coupling means having two first ends, one of said first ends being coupled with said crank pin of said first crank means and the other of said first ends being coupled with the other rocking end of said first bell crank;

a second control shaft rotated by second drive means;

a second bell crank having two rocking ends, said second bell crank being rockably supported by the front section of said base frame, one of said rocking ends being coupled with said cushion frame;

second crank means for imparting the rotation of said second control shaft to said second bell crank in a manner such that during one rotation of said second crank means, said second bell crank perform one rocking motion, said second crank means having a crank pin; and second coupling means having two second ends, one of said second ends being coupled with said second crank pin of said second crank means and the other second end being coupled with the other rocking end of said second bell crank.

6. A seat for motor vehicle as claimed in any one of claims 3 or 5, wherein the front side elevating mechanism is given a construction in which its upper part is coupled with said cushion frame and its lower part is coupled with an appropriate part of said crank.

7. The vehicle seat as claimed in any one of claims 1, 3 or 5 wherein said base frame consists of a pair of frame members that are located on the left and on the right which support respectively the left and right sides of the cushion frame as can be raised and lowered, a bell crank is mounted rockably on one of said base frame members via a pivotally supporting shaft, one of the rocking ends of the bell crank is connected to one side section of said cushion frame, the other end of the pivotally supporting shaft is supported by the other of said base frame members, and further, on the side of the other end of the pivotally supporting shaft there is provided a link that is interlocked with the bell crank and coupled with the other side section of said cushion frame.

8. A seat for motor vehicle as claimed in any one of claims 1, 3 or 5, wherein said crank is formed by projecting a crankpin on an end surface of a flat gear, and the flat gear is interlocked with a pinion on the control shaft.

9. A seat for motor vehicle as claimed in any one of claims 1, 3 or 5, wherein there is provided a knob for manual rotational operation as a united body to an end projected from the base frame, of the control shaft.

10. A seat for motor vehicle as claimed in any one of claims 1, 3 or 5, wherein there is connected an output terminal of a motor unit to the end, projected from the base frame, of the control shaft.

11. A seat for motor vehicle as claimed in any one of claims 1, 3 or 5, wherein there is also provided a reclining device for adjusting the angle of a seat back on one side in the rear section of the base frame.

* * * * *